(12) United States Patent
Li et al.

(10) Patent No.: US 9,607,060 B2
(45) Date of Patent: *Mar. 28, 2017

(54) AUTOMATIC GENERATION OF AN EXTRACT, TRANSFORM, LOAD (ETL) JOB

(71) Applicant: International Business Machines Corporation, Armonk, NY (US)

(72) Inventors: Jeff J. Li, Parkland, FL (US); Wendi L. Nusbickel, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

This patent is subject to a terminal disclaimer.

(21) Appl. No.: 14/298,125

(22) Filed: Jun. 6, 2014

(65) Prior Publication Data

US 2015/0100542 A1 Apr. 9, 2015

Related U.S. Application Data

(63) Continuation of application No. 14/044,945, filed on Oct. 3, 2013.

(51) Int. Cl.
*G06F 17/30* (2006.01)
*G06F 9/44* (2006.01)

(52) U.S. Cl.
CPC .............................. *G06F 17/30563* (2013.01)

(58) Field of Classification Search
CPC ......... G06F 17/30592; G06F 17/30563; G06F 17/30569; G06F 9/44
USPC .................................. 707/602; 717/106, 136
See application file for complete search history.

(56) References Cited

U.S. PATENT DOCUMENTS

| 6,604,110 | B1 | 8/2003 | Savage et al. |
| 8,024,369 | B2 * | 9/2011 | Pellegrini ............. G06F 9/5038 707/758 |
| 8,185,877 | B1 * | 5/2012 | Colcord ................... G06F 9/44 717/124 |
| 8,214,324 | B2 | 7/2012 | Joerg et al. |
| 8,676,772 | B2 * | 3/2014 | Gislason ...................... 707/696 |

(Continued)

OTHER PUBLICATIONS

Pentaho-Kettle: "Need to create ETL Jobs dynamically based on user input", Stack Overflow, http://stackoverflow.com/questions/6610759/pentaho-kettle-need-to-create-etl-jobs-dynamically-based-on-user-input, accessed Jun. 28, 2013, 3 pages.

(Continued)

*Primary Examiner* — Hosain Alam
*Assistant Examiner* — Robert F May
(74) *Attorney, Agent, or Firm* — Susan Murray; Edell, Shapiro & Finnan, LLC

(57) ABSTRACT

According to one embodiment of the present invention, a method automatically generates one or more Extract, Transform and Load (ETL) jobs. Input data in a source format and output data in a target format is received. The input data and output data is analyzed to determine properties and relationships thereof. One or more mapping models are automatically generated using the properties and relationships, wherein the mapping models describe the mapping and transformation of the input data to the output data. One or more ETL jobs are generated using the mapping models. Embodiments further include a system and program product apparatus for automatically generating one or more ETL jobs.

6 Claims, 9 Drawing Sheets

(56) References Cited

U.S. PATENT DOCUMENTS

| | | | |
|---|---|---|---|
| 2007/0074155 A1* | 3/2007 | Ama | G06F 17/30563 717/106 |
| 2008/0091720 A1 | 4/2008 | Klummp et al. | |
| 2008/0281849 A1* | 11/2008 | Mineno | G06F 17/30566 |
| 2010/0211539 A1 | 8/2010 | Ho | |
| 2011/0055147 A1* | 3/2011 | Joerg | G06F 9/4843 707/602 |
| 2011/0125705 A1* | 5/2011 | Aski | G06F 8/30 707/602 |
| 2012/0054147 A1 | 3/2012 | Goetz et al. | |
| 2012/0265726 A1 | 10/2012 | Padmanabhan | |
| 2014/0310231 A1* | 10/2014 | Sampathkumaran | G06F 17/30563 707/602 |
| 2015/0026114 A1* | 1/2015 | Triff | G06F 17/30563 707/602 |

OTHER PUBLICATIONS

Tianying He, et al.: Microsoft SQL Server 2008, "Build a Metadata-Driven ETL Platform by Extending Microsoft SQL Server Integration Services", Mar. 2008, Microsoft Corporation, 15 pages.

* cited by examiner

```
<< input1: dept>>
dept_id, dept_kind, annual_budget, manager_id          805
varchar, varchar, float, varchar
=====================================
A100,Division,1.0E+08,A7100

<<input2: emp >>
firstName,middleName,lastName,gender,dateOfBirth,title,hireDate,employeeID,departmentID
varchar, varchar, varchar, varchar, date, varchar, date, varchar, varchar
=====================================================================
Zen,P,Wright,male,1980-04-04,Mr,2008-07-11,A8990,A100
                                                                       810
<<input3: address >>
emp_id,street,city,state,country,postal_code,address_type
varchar, varchar, varchar, varchar, varchar, varchar,
==========================================
A8990,2301 East Lamar Blvd,Arlington,Texas,USA,78363,O
A8990,2001 West Street,Arlington,Texas,USA,78300,H          815
```

FIG.8A

```
<<output: result.xml>>
varchar
<?xml version="1.0" encoding="UTF-8"?><org:departments
xmlns:org="http://ibm.com/infosphere/xml/Organization">
   <department departmentID="A100" departmentKind="Division">
      <manager>A7100</manager>
      <tns:employees xmlns:tns="http://ibm.com/infosphere/xml/Employee">
         <tns:employee employeeID="A8990">
            <name>
               <firstName>Zen</firstName>
               <middleName>P</middleName>
               <lastName>Wright</lastName>
            </name>
            <gender>male</gender>
            <dateOfBirth>1980-04-04</dateOfBirth>
            <title>Mr</title>
            <Address>
               <street>2301 East Lamar Blvd</street>
               <city>Arlington</city>
               <state>Texas</state>
               <country>USA</country>
               <postalCode>78363</postalCode>
               <address_type>O</address_type>
            </Address>
            <Address>
               <street>2001 West Street</street>
               <city>Arlington</city>
               <state>Texas</state>
               <country>USA</country>
               <postalCode>78300</postalCode>
               <address_type>H</address_type>
            </Address>
            <hireDate>2008-07-11</hireDate>
         </tns:employee>
      </tns:employees>
      <annualBudget>1.0E8</annualBudget>
   </department>
</org:departments>
```

AUTOMATIC GENERATION OF AN EXTRACT, TRANSFORM, LOAD (ETL) JOB

CROSS-REFERENCE TO RELATED APPLICATIONS

This application is a continuation of U.S. patent application Ser. No. 14/044,945, entitled "AUTOMATIC GENERATION OF AN EXTRACT, TRANSFORM, LOAD (ETL) JOB" and filed Oct. 3, 2013, the disclosure of which is incorporated herein by reference in its entirety.

BACKGROUND

1. Technical Field

Present invention embodiments relate to data analysis, and more specifically, to automatic generation of an Extract, Transform, Load (ETL) job.

2. Discussion of the Related Art

Extract, Transform, Load (ETL) jobs extract data from a source, transform the extracted data using one or more transformations to a format compatible with a target, and load the data into the target, for example a target database. Existing tools to create ETL jobs are time consuming and complex, requiring specialized skills and training. Input data elements must be manually mapped to output data elements, and complex data transformations must be selected on a step-by-step basis.

To ease this process, existing tools often employ complex Graphical User Interfaces (GUI) requiring users to select transformations that convert input data into desired output data. However, users often do not know what transformations are needed, or how to set up a sequential series of transformations as may be required. Other existing tools require users to provide complex transformation metadata to the ETL job creation process, which is also complex and time consuming. For these reasons, businesses often hire outside experts to design and construct ETL jobs. Once the ETL job is created, future changes to maintain the job would again require specialized skills.

BRIEF SUMMARY

According to one embodiment of the present invention, a method automatically generates one or more Extract, Transform and Load (ETL) jobs. Input data in a source format and output data in a target format are received. The input data and output data are analyzed to determine properties and relationships thereof. One or more mapping models are automatically generated using the properties and relationships, wherein the mapping models describe the mapping and transformation of the input data to the output data. One or more ETL jobs are generated using the mapping models.

BRIEF DESCRIPTION OF THE SEVERAL VIEWS OF THE DRAWINGS

Generally, like reference numerals in the various figures are utilized to designate like components.

FIGS. 8A and 8B illustrate example input and output data according to an embodiment of the present invention.

DETAILED DESCRIPTION

Present invention embodiments may create ETL jobs using sample input data and associated sample output data. Additionally, a schema may be provided for the sample input data and/or sample output data to help determine data properties and relationships. If a schema is not provided, a schema may be automatically generated based on the sample input data and/or associated sample output data. Using the sample data and associated one or more schemas, one or more mapping models may be created that are utilized to generate one or more ETL jobs.

Figure 1:
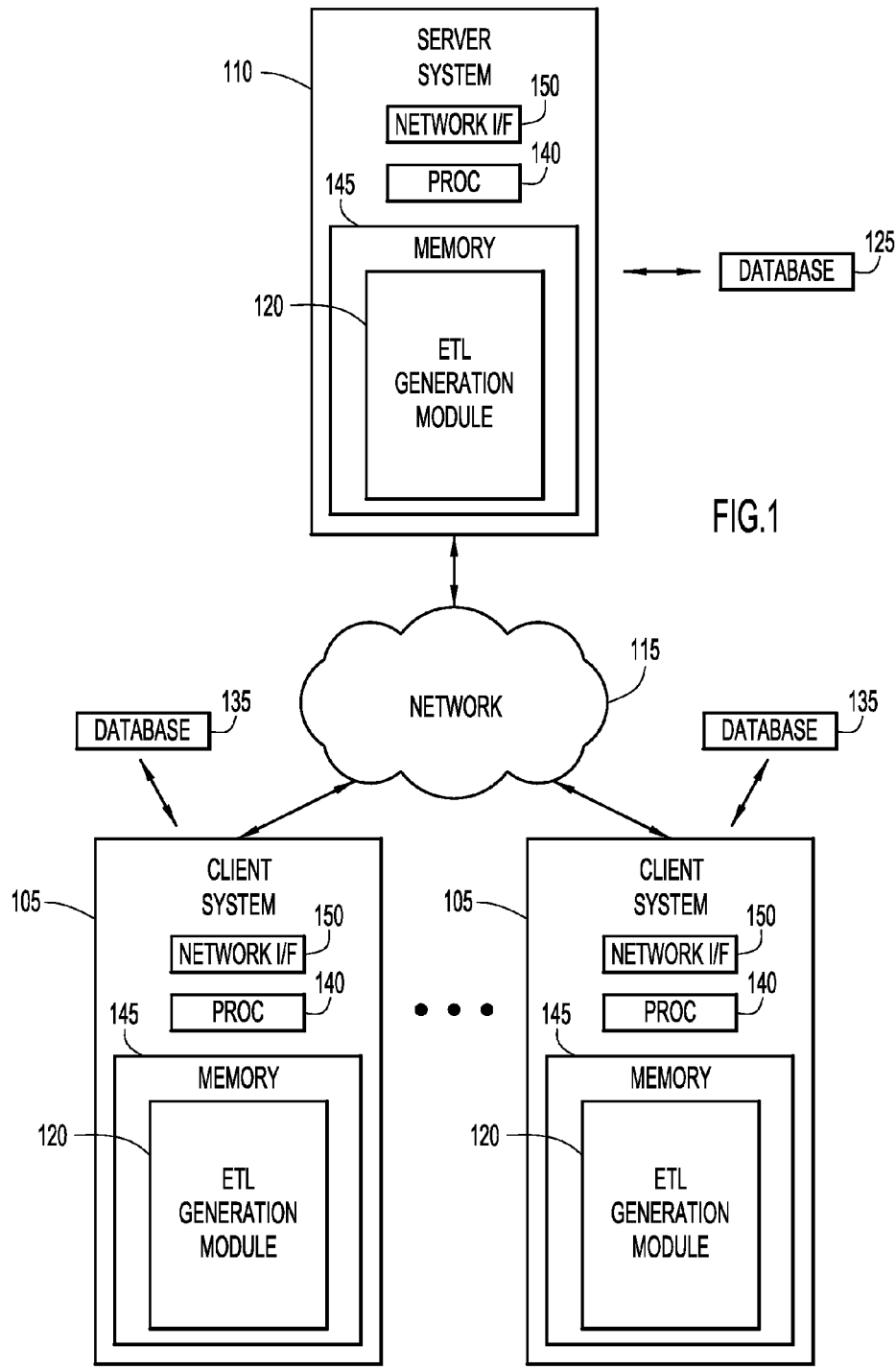
FIG. 1 is a diagrammatic illustration of an example computing environment for use with an embodiment of the present invention.

With reference now to FIG. 1, an example computing environment of present invention embodiments is shown in which one or more client systems 105 communicate with a server 110 via a network 115 to generate ETL jobs.

Server systems 110 and client systems 105 may be remote from each other and communicate over network 115. The network may be implemented by any number of any suitable communications media (e.g., wide area network (WAN), local area network (LAN), Internet, Intranet, etc.). Alternatively, server system 110 and client systems 105 may be local to each other, and communicate via any appropriate local communication medium (e.g., local area network (LAN), hardwire, wireless link, Intranet, etc.).

Client systems 105 may enable users to submit information (e.g., schemas, sample input data, sample output data, etc.) to server system 110 to determine data mappings for an ETL job. The server system includes an ETL generation module 120 to analyze sample input and output data and automatically produce ETL jobs as described below. Database systems 125 and 135 may store information for the analysis (e.g., mappings, properties of elements for input and output data, relationships between input and output elements, etc.). The database systems 125 and 135 may be implemented by any conventional or other database or storage unit, may be local to or remote from server systems 110 and client systems 105, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the generation of ETL jobs, and may provide reports including analysis results (e.g., metrics, mapping models, ETL job selection, etc.).

Server system 110 and client systems 105 may be implemented by any conventional or other computer systems preferably equipped with a display or monitor, a base (e.g., including at least one processor 140, one or more memories 145 and/or internal or external network interfaces or communications devices 150 (e.g., modem, network cards, etc.)), optional input devices (e.g., a keyboard, mouse or other input device), and any commercially available and custom software (e.g., server/communications software, ETL generation module, browser/interface software, etc.).

Alternatively, one or more client systems 105 may generate ETL jobs as a stand-alone unit. In a stand-alone mode of operation, the client system stores or has access to the data (e.g., database 135), and includes ETL generation module 120 to generate mappings and ETL jobs. The graphical user (e.g., GUI, etc.) or other interface (e.g., command line prompts, menu screens, etc.) solicits information from a corresponding user pertaining to the desired input/output documents and analysis, and may provide reports including analysis results.

ETL generation module 120 may include one or more modules or units to perform the various functions of present invention embodiments described below. The various modules may be implemented by any combination of any quantity of software and/or hardware modules or units, and may reside within memory 145 of the server and/or client systems for execution by processor 140.

Figure 2:
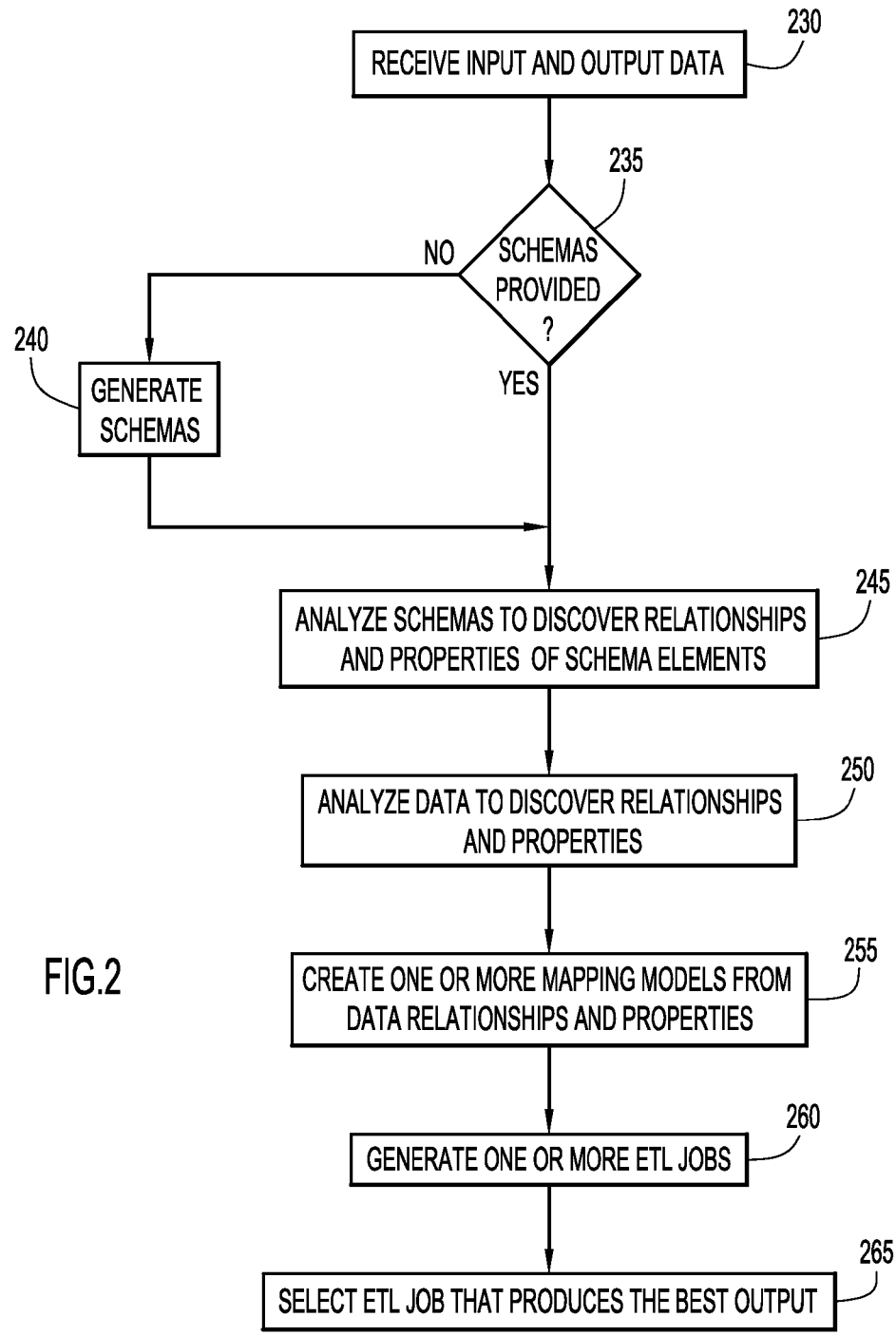
FIG. 2 is a procedural flow chart illustrating a manner in which ETL jobs are automatically generated using sample input data and sample output data according to an embodiment of the present invention.

With reference to FIG. 2, an example flow chart is shown that illustrates the creation of one or more mapping models from sample data and/or sample schemas (e.g., via ETL generator module 120 and server system 110 and/or client system 105). The mapping models are then used to create one or more ETL jobs.

Initially, sample input data and sample output data are received at step 230. The sample input data and output data may be a flat file (e.g. flat files from databases, or simply data values, etc.), or may be presented in a relational (e.g. .DB, .MDE, .NSF, .MYD, or other relational database representation) or hierarchical (e.g. Extensible Markup Language (XML), or JavaScript Object Notation (JSON)) format. The input may be received either via a GUI or command prompt interface. Some embodiments may not require schemas, and a requirement for a schema may be predetermined by a user or administrator. A schema is a blueprint that describes the structure of a database table or a structured data document such as XML document, and may be provided for either the sample input data, the sample output data, or both. If a schema is required as determined at step 235, but not provided, the schema may be automatically generated at step 240, as described below. Step 245 discovers properties of elements within the input and/or output data schemas, and relationships among input data elements and output data elements. At step 250, the sample input data and sample output data are also analyzed to discover relationships among input data elements and output data elements, and properties of individual elements. The relationships may be used to automatically create one or more mapping models at step 255. A mapping model describes how input data elements map to output data elements, and describes any transformations that may occur. Each mapping model may be used to generate an ETL job at step 260. An ETL job can be executed to extract data from a data source, transform the extracted data using any number or combination of transformations to be compatible with a target, and load the transformed data into the target, such as a destination database. Among the generated ETL jobs, one job may produce the best output in accordance with user or other preferences. This ETL job may automatically be selected for use at step 265, and the other ETL jobs may be discarded.

Figure 3:
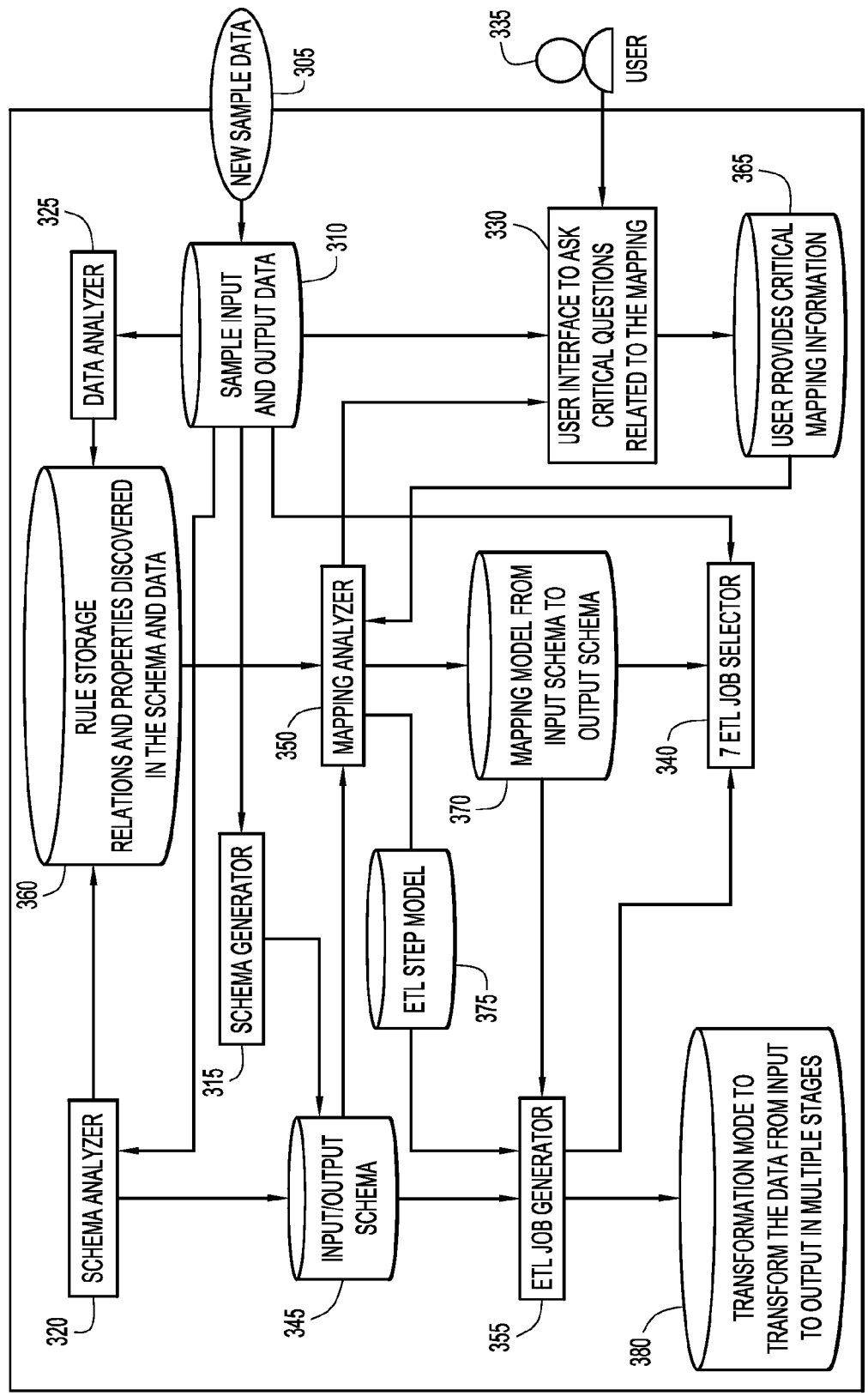
FIG. 3 is a flow diagram illustrating a manner in which ETL jobs are automatically generated by system components using sample input data and sample output data according to an embodiment of the present invention.

Turning to FIG. 3, an example flow diagram is shown that illustrates various components (e.g., of ETL generation module 120) for ETL job generation, and various forms of data storage (e.g. database system 125 and/or 135) associated with the components, according to an embodiment of the present invention. At step 305, sample input and/or output data is received, which is stored in a data store at step 310. This data store may provide sample input and output data to multiple other components, such as a schema generator 315, a schema analyzer 320, a data analyzer 325, a user interface 330 that may request further information from a user 335, and a job selector 340.

If a schema is required, but not provided, a schema may first be generated by schema generator 315, as described below. Generated schemas are stored within a data store 345, where the schemas may be accessed by schema analyzer 320, mapping analyzer 350, and ETL job generator 355. Schemas may also be provided by user 335, stored in schema storage 345 and accessed by schema analyzer 320, which analyzes the schemas and discovers the relationships and properties of the schema elements which are used in the sample input data and output data. The sample input data and output data are analyzed by data analyzer 325, which discovers relationships and properties based on the values in the sample input and output data. Both the data analyzer and schema analyzer may provide discovered relationships and properties to a rule storage 360.

Mapping analyzer 350 uses discovered relationships and properties from the rule storage to create one or more mapping models. The mapping analyzer may consult an ETL step model of a store 375, which defines all available transformation steps that may be used. A mapping model maps the data elements of the input schema to the data elements in the output schema, and describes the transformation that may be done to the data in the process. However, the sample input data and output data and associated schemas may be insufficient to create a mapping model free of ambiguities. Multiple incompatible mapping models may produce the same output for a given input. In this case, the system may ask the user, via interface 330, critical questions related to the mapping to reduce the number of compatible mapping models given the available set of transformations. The user feedback is stored in store 365 and provided to mapping analyzer 350, which stores remaining possible mappings in store 370. The mapping models are each converted into a job by ETL job generator 355. The ETL job generator may receive input or output schemas from store 345, or from the ETL step model stored in store 375, to confirm that mapping models conform to schema properties and relationships, and an available transformation set.

Once ETL jobs are generated, the jobs may be evaluated by ETL job selector 340. The job selector runs the generated ETL jobs using the provided sample input to produce an output that can be compared with the provided sample output. The best job can be selected, and stored in database 380, where the one or more jobs may be accessed for future ETL operations.

In this manner, instead of purchasing complex and expensive ETL design tools, training employees, and/or contracting expensive services to create ETL jobs, users can run the job generator providing only sample input and output data and/or input and output data schemas. No ETL job user design is required. Without specialized training, techniques of present invention embodiments can be performed by a command line tool or a graphical user interface (GUI), and/or as an automated, script-driven programs. The user does not need to provide mapping specifications or a list of transformations (e.g. join, parse, etc.). Even if the requirements of the customer data for the job changes, the ETL job can simply be automatically generated again or updated. This ETL job adaptation can also be performed at runtime (as opposed to design time).

Figure 4:
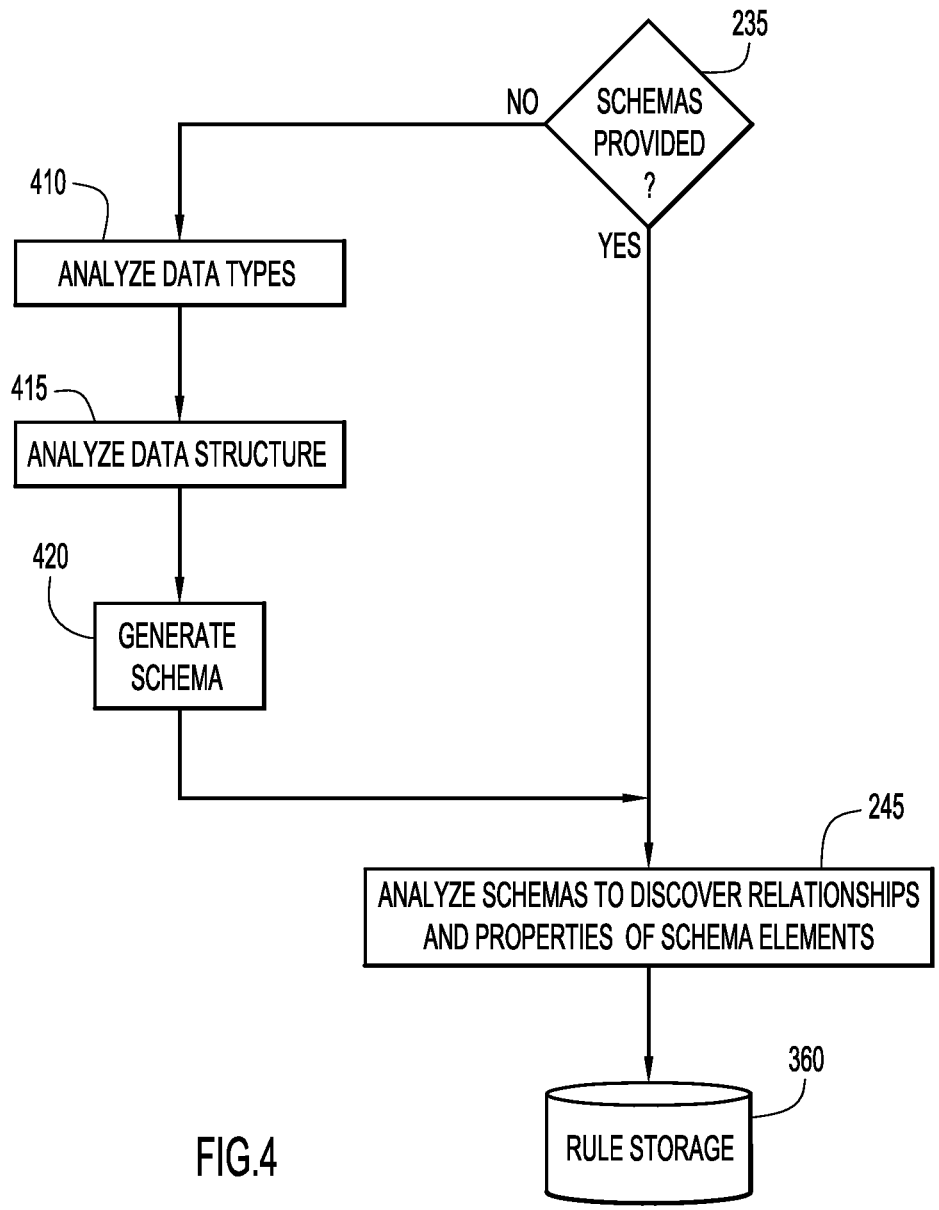
FIG. 4 is a procedural flow chart illustrating a manner of automatic generation and analysis of schemas according to an embodiment of the present invention.

Operation of schema generator 315 and schema analyzer 320 are described with reference to FIG. 4. If one or more schemas are provided as determined at step 235, schema analysis is performed to discover relationships and properties of schema elements at step 245. If the schema has not been provided, schema generation is performed. In particular, at step 410, data types of the sample input and output data are analyzed. For example, if a "revenue" element in the sample input is $105.50, the element may be given a float value in the schema. If the element is a whole number, it may be given an integer value in the schema. If only alphabetic characters are provided, the element may be labeled a string. If the numbers appear to be a date, the element may be considered a date. Certain keywords for element names may be factored into this consideration. For example, even if an element is blank or unrecognizable, if the name of the input element is "date," the corresponding element in the schema may be considered a date. Schemas may be created for both the input data and the output data, as necessary. This analysis can be performed on hierarchical database input (e.g. an XML file), relational database input, or a flat file.

The data structure of the sample input data and sample output data may be analyzed at step 415. If the sample input or output files are flat, little about the structure of the data can be inferred. However, relational or hierarchical sample input and/or output files can be self describing. Much of the structure of an XML schema from a sample XML data file can be obtained by removing data instances, and inserting data type information.

The greater the amount of sample input data received, the more accurate the schema generation. For example, one XML element "widget" may have three attributes as sub-nodes. Yet, a sample input file may only show a widget with two of these attributes. This would cause the schema generator to incorrectly assume that there are only two attributes. The schema and corresponding mapping model and ETL job may be updated continually as more data is received in the future, which allows the third attribute to eventually be discovered.

If input data is relational data, the system may attempt to locate a database dictionary to acquire data relationship and structure information. The user may be asked database connection information, and sample files that are provided may be automatically scanned for connection information. Once schema data types and data structures are analyzed, the schema is generated at step 420.

Schema analyzer 320 uses either provided or generated schemas to discover relationships among input and output data elements (e.g. fields), as well as relationships between input and output data elements. Properties such as data types are also discovered, and the results are stored in rule storage 360.

Database schemas by definition describe the structure of a database, so properties such as data field types, table relationships, or lists of data fields for a given data table, etc., may be imported into rule storage 360. Inferences may be made based upon the schema structure. Parent and child relationships may be inferred. For example, there may be a "department" node, with multiple sub-nodes. Each sub-node is a child attribute that can be added to the list of attributes associated with a department. Also for example, an "employee" node may have multiple "address" sub-nodes. The schema analyzer would infer that "address" is not a unique attribute for employee nodes. The schema analyzer may also update the set of data relationships and data properties stored in rule storage 360 in response to detecting a new input or output schema, whether provided or generated, or when an existing schema is updated, for example in response to new input or output data.

Figure 5:
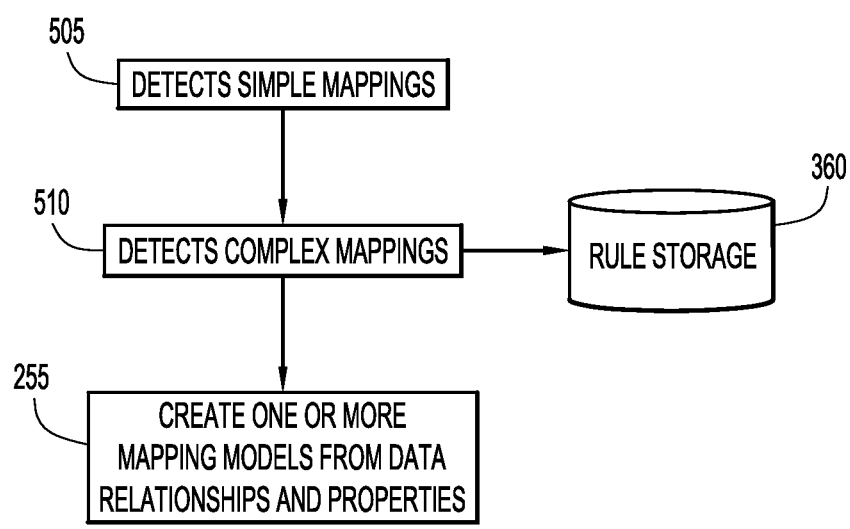
FIG. 5 is a procedural flow chart illustrating a manner of analyzing input and output data to generate mappings according to an embodiment of the present invention.

Data relationships and properties are also discovered in the data by data analyzer 325, as shown in FIG. 5. The data analyzer may discover data relationships and properties either with or without the use of schemas. The data analyzer may first discover simple mappings based upon the sample input and output data at step 505. For example, if data elements in the input and output sample have the same name or value, the data analyzer may infer that these elements map to each other. If the data elements have a similar name, perhaps sharing a few letters, an inference may also be made that the elements can be mapped, the inference being stronger if the values are the same. The data type may also influence the inference, for example if both the sample input and sample output elements are detected as dates.

The data analyzer may also detect complex mappings at step 510, and may Check to ensure that a detected transformation is in a list of possible transformations. For example, an "address" element in the sample input data may contain a long string which is split to form "street number," "street name," and "city" elements. The data analyzer may automatically detect that there is no element in the sample output containing the full contents of the string, and may also detect that fragments of the sample input file address element can be found in three output elements. The data analyzer may detect the rules associated with the split. In this case, the address element may be split at each blank space, with the first portion going to a street number element, the second portion after a blank space going to the street name element, and the string remainder after the second space going to a city element. The address element may also be split by number of characters, with the first three characters, going to the street number element, etc. The address element portions to be split may also be separated by commas, tabs, or semicolons, etc., which the data analyzer may detect and store in rule storage 360. Multiple possible mappings may be detected by the data analyzer, which may all be stored in rule storage 360, and may result in the creation of more than one mapping model at step 255.

The data analyzer may also detect a join function. The data analyzer may detect that two flat input structures are mapped to an output structure with parent-child relationship based on a key value. For example, two flat input structure "employee" and "address" may be joined to form a parent-child output structure to describe that an employee may contain zero to many addresses. The data analyzer may discover this join relationship and store the rule in the rule storage.

Another detectable transformation is a composer operation, which detects a difference in input and output data structures. For example, an input flat file or relational database may be transformed into a hierarchical XML file format. The composer function may be performed on the associated XML schema to accomplish this transformation. Another transformation is a sort operation, where attributes may be sorted by a certain property, such as alphabetically by a given element value. For example, a list of employees may always be sorted by last name in the sample output. The data analyzer may detect that nodes have been reordered in the sample output, and determine that a certain element in the nodes is being used to determine the sort order. The data analyzer stores these rules in rule storage 360. Other transformations and mapping possibilities would be within the scope of techniques presented herein.

Other operations are within the scope of embodiments of the present invention. For example, hierarchical data may be parsed using a parser command, which may be used to read input based on an input schema. A regroup operation may be used to create a hierarchical parent-child list of elements from, for example, a relational database file. The regroup operation may be used with the composer operation to convert a relational flat structure into a hierarchical structure. A union operation may be used to combine two or more data sets with similar structures. Input and output steps may also be used to integrate with other systems.

Aggregate functions may also be automatically detected and mapped. These functions are calculations on a set of values that return a single value (for example, average, maximum, minimum, sum, concatenate, etc.). The mapping analyzer, data analyzer, or job generator may, for example, detect that a set of input elements are averaged to form an output element value. This transformation may be detected by performing various aggregate functions on a first of input values to produce output element values, which may be performed on input values in a similar hierarchical or relational location. The destination field name may also be searched to detect this transformation. For example, if the destination element name contains the word "average" or letters "avg," a mapping model may be automatically created with an average transformation applied to whichever input fields may be averaged to produce the output element value. These operations may be performed if no simple mapping for a given output field can be found. Similar techniques may be used with other aggregate functions.

The data analyzer may also detect a multi-step transformation. For example, a portion of a first element and a portion of a second element may be used to form a third element. This is a multi-step transformation involving first splitting the first sample input element and second sample input element, and combining the two fragments into the sample output element with a aggregate operation. The data analyzer may detect the split rules of the input elements as previously mentioned (separated by space, comma, semicolon, etc.).

The accumulated rules in rule storage 360 may be used by the mapping analyzer 350 to create one or more mapping models which may describe mapping and transformations of the sample input data to the sample output data. Simple and complex mappings detected by the data analyzer are used. If more than one mapping is possible, multiple mapping models may be created. Complex mapping possibilities may be eliminated by examining possible rules discovered by the data analyzer in view of the provided or generated schema. For example, if two input elements appear to be joined to form the contents of an output element, this possible mapping may be eliminated if the joined element is in a different portion of the data structure (e.g. a different location in the XML node hierarchy than the two corresponding input elements). Other possible mapping models may be eliminated by requesting input from user 335. The mapping analyzer may not be able to resolve all data ambiguities and, as a result, multiple valid mapping models will remain to be converted to ETL jobs.

Figure 6:
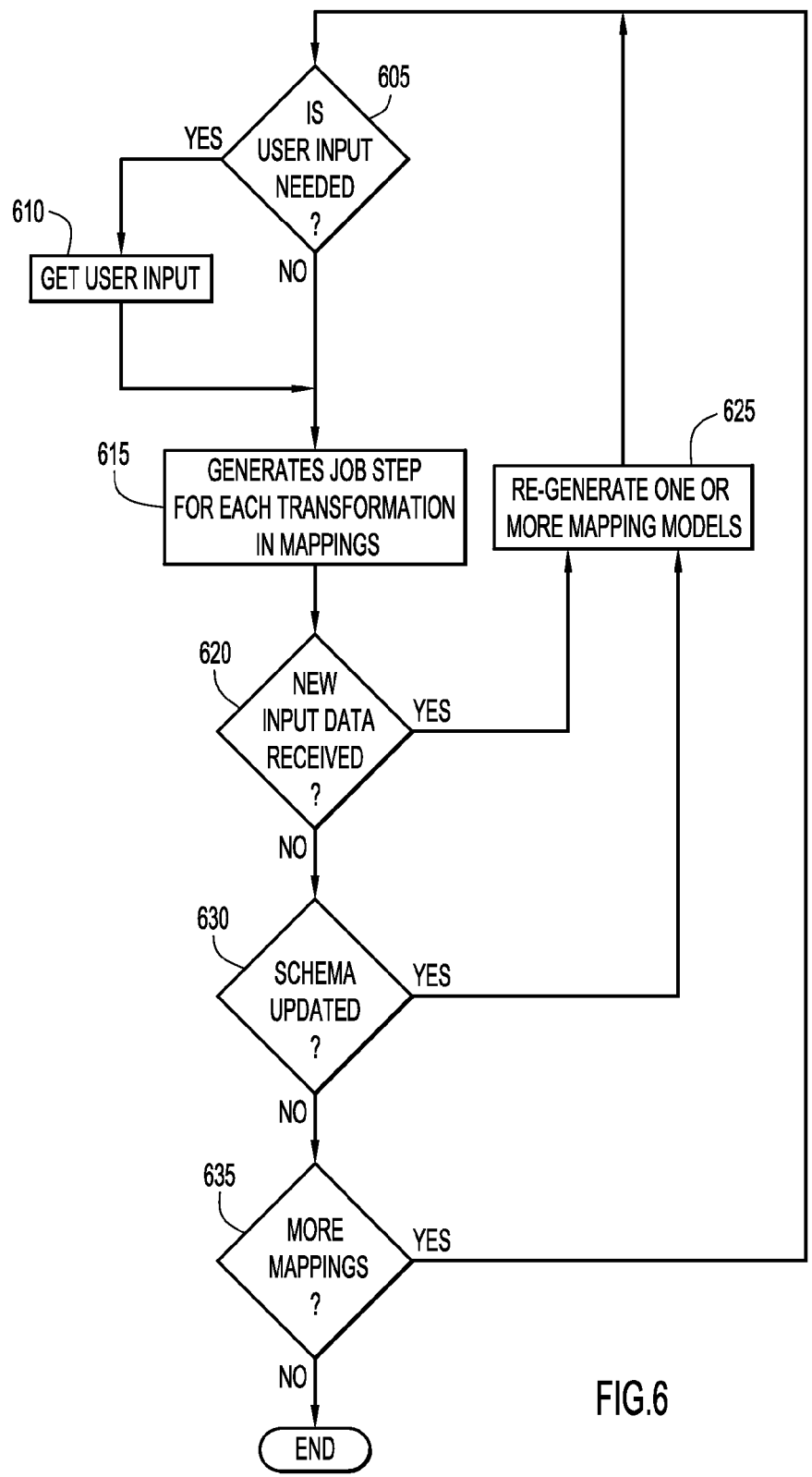
FIG. 6 is a procedural flow chart illustrating a manner of generating an ETL job according to an embodiment of the present invention.

A manner of selecting mapping models is shown in FIG. 6. At steps 605 and 610, user input about specific mappings and transformations is requested. ETL job generator 355 may generate one or more potentially multi-step jobs at step 615. One ETL job is created for each mapping model. Each job is composed of steps, with each step mapping a transformation from one or more inputs to one or more outputs based on the mapping model. The job generator may consult a step model in store 375 to ensure that each transformation performed is permitted. The job generator may also update or recreate a job automatically when additional input data and/or output data is received at step 620. The mapping analyzer and job generator adapts the mapping model and ETL job to be compatible with both the old and new input data. Further, if new input or output data received violates the mapping model used to generate the ETL job currently being used, the mapping model and ETL job may be regenerated automatically at step 625. Finally, if an updated schema for the input or output data is received at step 630, the mapping model and ETL job may be regenerated automatically at step 625. The ETL job creation process may repeat at step 635 until ETL jobs have been created for all mapping models.

Figure 7:
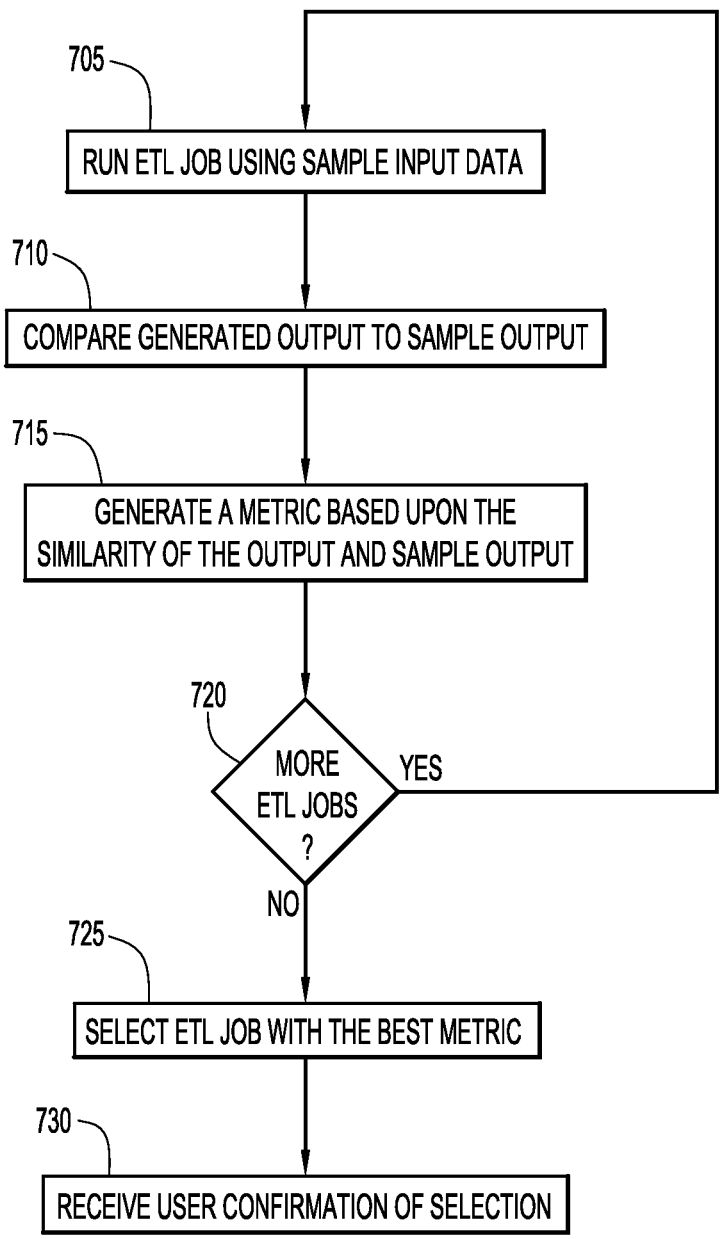
FIG. 7 is a procedural flow chart illustrating a manner of selecting an ETL job according to an embodiment of the present invention.

If there are multiple ETL jobs that have been created thr the sample input and output, ETL job selector 340 may help reduce the number of jobs, as shown in FIG. 7. At step 705, an ETL job may be selected to transform the sample input data. The ETL job generates output data, which may be compared with the sample output data for accuracy at step 710. After evaluating all ETL jobs at step 720, the ETL job which contains the fewest errors when compared with the sample output data may be selected thr use. A metric may also be generated reflecting the number of errors in output for each mapping model at step 715, where the mapping model with the best metric is selected for use at step 725. Other ETL job selection criteria are possible. For example, an ETL job may be selected based upon lowest memory usage, or fastest execution time. Metrics may also be combined. For example, if multiple ETL jobs produce the same best-metric or error-free output, the job selector may choose the job which executes the fastest. Other metrics and combinations thereof would be within the scope of techniques presented herein. If multiple jobs still remain, a user may be consulted at 730. A visual display with icons indicating differences in ETL job outputs, indicators of errors relative to the sample output may be shown, etc. The user may also be asked simply to conform the selection of mapping and associated ETL job, with a display showing any differences between the output produced by the ETL job and the sample output.

FIGS. 8A and 8B depict an example input and output file which may be used to generate a schema, mapping model, and ETL job. FIG. 8A depicts three separate inputs 805, 810, 815 as flat data, with data element names and sample values. The input data is mapped and possibly transformed to form output data 820 in FIG. 8B.

Operation of a present invention embodiment is described with reference to FIGS. 2-7 and 8A-8B. A user may first provide associated schemas with the input and output sample data. If they do not, the schemas are generated as described above. Schema analyzer 320 may analyze the schemas and discover data relationships and properties. If the inputs are from database tables, the schema analyzer may attempt to find a database dictionary to determine table relationships between the "dept," "emp" and "address" data elements. From the output XML schema, the schema analyzer may learn that each department contains one employee, while each employee may contain multiple addresses.

Data analyzer 325 may further discover data relationships and properties based upon the sample data. For example, the data analyzer may notice that the "dept_id" element has the same value as the "departmentID" element in the sample output. Similarly, the "emp_id" element in the input has the same value as the "employeeID" in the output. Further, the sample data in the input dept is mapped to the XML element dept, the input emp is mapped to the XML element employee, and the input address is mapped to the XML element address.

Mapping analyzer 350 may create one or more mapping models to map the input schema to the output schema based on the relationships and properties discovered by the schema analyzer and data analyzer. In this case, the input dept is mapped to output dept, input emp is mapped to the output employee, and input address is mapped to the output address. Multi-step transformations may also be determined.

ETL job generator 355 may now use the one or more mapping models to generate one or more ETL Jobs. Complex transformations may be applied, for example, a join between input emp and input address based on the employeeID and emp_id to create the parent-child relationship shown between the XML element employee and address. A join between the input dept and the employee elements may be performed to create the parent-child relationships shown in the sample output 820. Finally, a composer transformation is needed to generate the XML data 820 from the XML schema and input data 805, 810 and 815. Job generator 355 may consult a step model in store 375 to determine what transformations are permitted.

Since multiple ETL jobs may now exist that can produce the same or similar mappings, the ETL job selector 340 may be executed to select among jobs.

It will be appreciated that the embodiments described above and illustrated in the drawings represent only a few of the many ways of implementing embodiments for automatic generation of an ETL job.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, arouse, voice recognition, etc.) to enter and/or view information.

It is to be understood that the software (e.g., ETL generation module, schema generator, mapping analyzer, schema analyzer, data analyzer, etc.) of the present invention embodiments may be implemented in any desired computer language and could be developed by one of ordinary skill in the computer arts based on the functional descriptions contained in the specification and flow charts illustrated in the drawings. Further, any references herein to software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., ETL generation module, schema generator, mapping analyzer, schema analyzer, data analyzer, etc.) may be available on a non-transitory computer readable or useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data (e.g., input and output data and schemas, ETL mappings and jobs, etc.).

The present invention embodiments may employ any number of any type of user interface (e.g., Graphical User Interface (GUI), command-line, prompt, etc.) for obtaining or providing information (e.g., user feedback concerning mapping models), where the interface may include any information arranged in any fashion. The interface may include any number of any types of input or actuation mechanisms (e.g., buttons, icons, elements, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., text analytics, profile scores, demographic information pertaining to the document author, etc.).

The present invention embodiments may receive, transform into and load other file types than those described above. Further, any type of database or data store may be used and interacted with in the performance of steps described above. Using techniques similar to those presented above, many more data transformations than those listed above may be discovered, mapped, and used. The discovery of data transformations is not limited to the specific task of ETL job generation, mapping model generation, or ETL job selection. The present invention embodiments are not limited to use of the specific data types described above.

The present invention embodiments are not limited to the specific tasks or algorithms described above, but may be utilized for any task requiring hierarchical or relational database schema generation, data transformation discovery, data element mapping discovery, etc.

The terminology used herein is for the purpose of describing particular embodiments only and is not intended to be limiting of the invention. As used herein, the singular forms "a", an and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more job instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for automatically generating one or more Extract, Transform and Load (ETL) jobs comprising:
   receiving a data set including input data in a source format and output data in a target format;
   analyzing the data set to generate a schema using the input data and output data and determine properties and relationships between the input data and output data using the generated schema;
   automatically generating a plurality of mapping models from the analyzing using the determined properties and relationships between the input data and output data, wherein each of the mapping models describes a different mapping and transformation of the input data to the output data;
   generating a plurality of ETL jobs each using a different one of the mapping models;
   executing each of the ETL jobs using the input data and comparing the results of each of the executed ETL jobs to the output data; and
   selecting the ETL job for use from among the plurality of ETL jobs based on a combination of metrics pertaining to accuracy determined from the comparing and computing resource utilization.

2. The method of claim 1, further comprising:
   detecting that the schema has been modified to form a modified schema; and
   updating the plurality of mapping models based on the modified schema.

3. The method of claim 1, wherein the selecting further comprises:
   obtaining user input to select the ETL job from among the plurality of ETL jobs.

4. The method of claim 1, wherein the selecting further comprises:
   selecting the ETL job for use with the fewest amount of errors based on the comparing.

5. The method of claim 1, further comprising:
   updating a mapping model, in response to detecting a violation of that mapping model in additional input data.

6. The method of claim 1, wherein automatically generating the plurality of mapping models further comprises:
   generating a complex mapping from input data to output data using a transformation operation, the transformation operation selected from a group consisting of: join, split, composer, and sort.

* * * * *